US008065461B2

(12) United States Patent
LaBerge

(10) Patent No.: US 8,065,461 B2
(45) Date of Patent: Nov. 22, 2011

(54) CAPTURING READ DATA

(75) Inventor: Paul A. LaBerge, Shoreview, MN (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 12/911,595

(22) Filed: Oct. 25, 2010

(65) Prior Publication Data

US 2011/0047312 A1 Feb. 24, 2011

Related U.S. Application Data

(63) Continuation of application No. 10/838,511, filed on May 4, 2004, now Pat. No. 7,822,904, which is a continuation of application No. 09/363,605, filed on Jul. 29, 1999, now Pat. No. 6,763,416.

(51) Int. Cl.
*G06F 13/36* (2006.01)

(52) U.S. Cl. ........................................ 710/310; 710/306

(58) Field of Classification Search .......... 710/305–306, 710/310–311, 313–315
See application file for complete search history.

(56) References Cited

U.S. PATENT DOCUMENTS

| | | | | |
|---|---|---|---|---|
| 5,148,113 A * | 9/1992 | Wight et al. | ...................... | 327/3 |
| 5,309,565 A * | 5/1994 | Hollyer et al. | ................ | 710/105 |
| 5,623,635 A * | 4/1997 | Chen et al. | .................... | 711/152 |
| 5,623,638 A * | 4/1997 | Andrade | ...................... | 711/167 |
| 5,734,849 A * | 3/1998 | Butcher | ......................... | 710/305 |
| 5,768,548 A * | 6/1998 | Young et al. | ................... | 710/306 |
| 5,905,391 A * | 5/1999 | Mooney | ......................... | 327/161 |
| 5,906,659 A * | 5/1999 | Derrick et al. | .................. | 710/52 |
| 5,909,701 A * | 6/1999 | Jeddeloh | ........................ | 711/167 |
| 5,948,083 A * | 9/1999 | Gervasi | ........................... | 710/62 |
| 5,991,833 A * | 11/1999 | Wandler et al. | ................. | 710/52 |
| 6,101,612 A * | 8/2000 | Jeddeloh | ........................ | 713/401 |
| 6,195,759 B1* | 2/2001 | Salmon | ......................... | 713/600 |
| 6,199,131 B1* | 3/2001 | Melo et al. | .................... | 710/107 |
| 6,212,590 B1* | 4/2001 | Melo et al. | .................... | 710/119 |
| 6,243,817 B1* | 6/2001 | Melo et al. | .................... | 713/300 |
| 6,286,083 B1* | 9/2001 | Chin et al. | .................... | 711/151 |
| 6,292,521 B1* | 9/2001 | Lai et al. | ....................... | 375/357 |
| 6,321,315 B1* | 11/2001 | LaBerge | ....................... | 711/167 |
| 6,330,636 B1* | 12/2001 | Bondurant et al. | ........... | 711/105 |
| 6,401,213 B1* | 6/2002 | Jeddeloh | ........................ | 713/401 |
| 6,453,402 B1* | 9/2002 | Jeddeloh | ........................ | 711/167 |
| 6,505,305 B1* | 1/2003 | Olarig | ............................. | 714/5 |
| 6,601,151 B1* | 7/2003 | Harris | ........................... | 711/158 |
| 6,629,222 B1* | 9/2003 | Jeddeloh | ........................ | 711/167 |
| 6,763,416 B1* | 7/2004 | LaBerge | ....................... | 710/305 |

* cited by examiner

*Primary Examiner* — Thomas J Cleary
(74) *Attorney, Agent, or Firm* — Fletcher Yoder

(57) ABSTRACT

Various techniques are disclosed for providing data retrieved from a memory device and furnished to a memory bus in response to a read operation to a local bus interface. For instance, a set of conductive traces may be provided that forms a communication path between the memory bus and the local bus interface, such that the communication path formed by the conductive traces bypasses a memory bus interface coupled to the memory bus. In this manner, the data furnished to the memory bus may be communicated directly to the local bus without first being communicated to the memory bus interface.

26 Claims, 5 Drawing Sheets

CAPTURING READ DATA

CROSS-REFERENCE TO RELATED APPLICATIONS

The present application is a continuation of U.S. patent application Ser. No. 10/838,511 filed on May 4, 2004, now U.S. Pat. No. 7,822,904, which issued on Oct. 26, 2010, which is a continuation of U.S. patent application Ser. No. 09/363,605 filed on Jul. 29, 1999, now U.S. Pat. No. 6,763,416, which issued on Jul. 13, 2004.

BACKGROUND OF THE INVENTION

Embodiments of the invention relate to capturing read data.

Referring to FIG. 1, a typical computer system may include at least one bridge 10 to establish communication between different buses of the computer system 10. For example, the bridge 10 may include a memory interface 14 and a local bus interface 18 for purposes of establishing communication between memory devices that are coupled to a memory bus 12 and a bus agent that is coupled to a local bus 20. In this manner, a processor 21 (a central processing unit (CPU), for example) may furnish signals to the local bus 20 for purposes of initiating a request (called a memory read request) to retrieve data from a system memory 11. The local bus interface 18 detects the request by decoding the signals from the local bus 20 and communicates an indication of the request to the memory interface 14. The memory interface 14, in turn, furnishes signals to the memory bus 12 to initiate a memory read operation with the memory 11. In this manner, in the course of the memory read operation, the memory 11 furnishes signals (to the memory bus 12) that indicate the requested data, and the memory interface 14 captures the data into a buffer 15 of the memory interface 14. The bridge 10 subsequently transfers the captured data (via a multiplexing circuit 16) from the buffer 15 to a buffer 19 in the local bus interface 18. Subsequently, the local bus interface 10 may generate signals on the local bus 20 that indicate the processor's requested data.

As an example, exemplary signals on the memory bus 12 for a memory burst read operation are depicted in FIGS. 2, 3, 4, and 5 for the scenario where the memory 11 is formed from double data rate (DDR) synchronous dynamic random access (SDRAM) memory devices. In particular, the memory interface 14 initiates the burst read operation by furnishing signals (to the memory bus 12) that indicate a read command, as depicted in FIG. 3. At time $T_0$ on the positive edge of a memory bus clock signal (called CK (see FIG. 2)), a memory device (a memory module or memory chip, as examples) of the memory 11 latches the signals that indicate the read command, and the memory device begins responding to the burst read operation. In this manner, the memory device begins furnishing a data strobe signal called DQS (see FIG. 4) to a data strobe line of the memory bus 12 at time $T_1$ by driving the DQS signal from a tri-stated level to a logic zero level.

From time $T_2$ to time $T_6$, the DQS signal (under the control of the memory device) follows the CK signal, and during this time interval, the memory device furnishes a different set of data (a sixty-four bit set of data, for example) to the data lines of the memory bus 12 on each positive and negative edge (i.e., on each strobe edge) of the DQS signal. For example, at time $T_2$ beginning on the positive edge of the DQS signal, the memory device may furnish sixty-four bits of data (for a sixty-four bit data path, for example), and beginning at time $T_3$, the memory devices may furnish another sixty-four bits of data. As an example, a data signal (called DQ) from a data bit line of the memory bus 12 is depicted in FIG. 5. The DQ signal indicates a bit of data during a data eye. Thus, for example, the data eye for a bit $D_0$ occurs between times $T_2$ and $T_3$. Internally, the memory interface 14 may shift the DQS signal so that the strobe edges of the DQS signal are aligned in the center of the corresponding data eyes. Due to this arrangement, the edges may be used by the memory interface 14 to trigger the capture of data from the memory bus 12. At time $T_6$, the memory device stops driving the data strobe line, and the DQS signal returns to the tri-stated level.

The bridge 10 may retrieve the data from the buffer 15 using either an internal clock domain that typically has a higher frequency (double the frequency, for example) than the clock domain of the memory bus 12 or by alternatively using a larger internal datapath. As a result, the memory interface 14 may wait for several internal clock cycles to ensure that the data in the buffer 15 is valid before retrieving the data from the buffer 15. Once the data is retrieved, the bridge 10 routes the data to the local bus interface 18 via a data path 17 (depicted in FIG. 1) that extends from the memory interface 14, through the multiplexing circuit 16 and then to the buffer 19 in the local bus interface 18. Unfortunately, the data path 17 may introduce a significant asynchronous propagation delay, and the buffer 19 may not latch valid data until several internal clock cycles (two, for example) have elapsed after the data leaves the buffer 15. The additional internal clock cycles that are needed to transfer the data between the buffers 15 and 19 may extend the time needed to satisfy the read request.

Thus, there is a continuing need for a bridge that responds in a more timely fashion to a memory read request.

SUMMARY

Embodiments of the present invention may relate to techniques for providing data retrieved from a memory device and furnished to a memory bus in response to a read operation to a local bus interface. In particular, the disclosed embodiments may provide a set of conductive traces that form a communication path between the memory bus and the local bus interface, such that the communication path formed by the conductive traces bypasses a memory bus interface coupled to the memory bus. In this manner, the data furnished to the memory bus may be communicated directly to the local bus without first being communicated to the memory bus interface.

Advantages and other features of the invention will become apparent from the following description, from the drawings, and from the claims.

BRIEF DESCRIPTION OF THE DRAWINGS

The foregoing and other advantages of the invention may become apparent upon reading the following detailed description and upon reference to the drawings in which.

DETAILED DESCRIPTION

Figure 1:
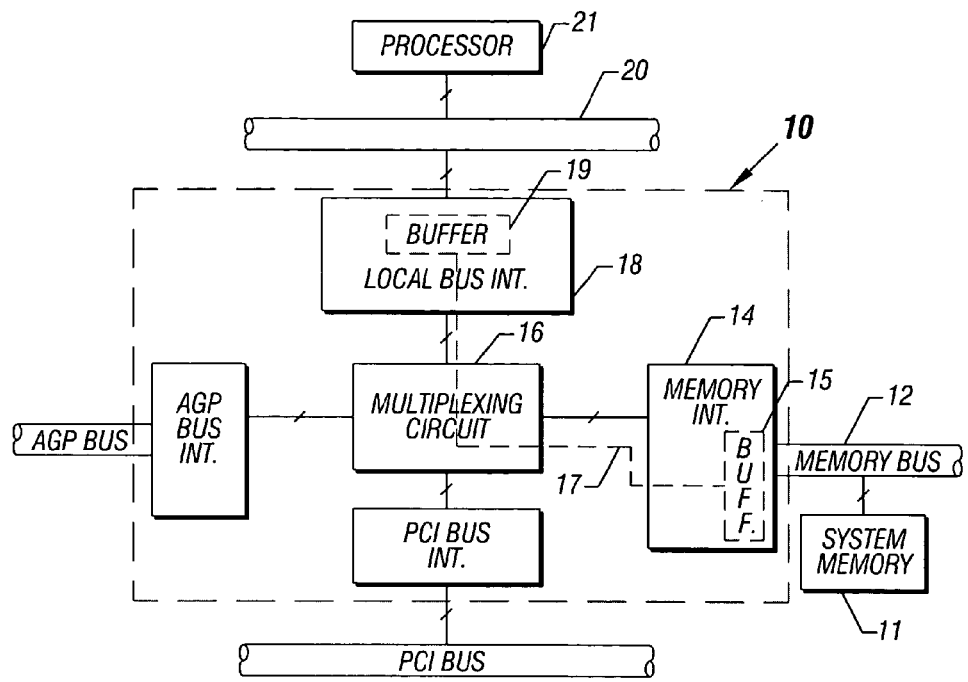
FIG. 1 is a schematic of a bridge circuit of the prior art.
Figure 2:
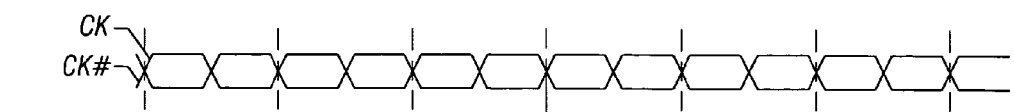
FIGS. 2, 3, 4 and 5 illustrates waveforms of memory bus signals of the prior art.
Figure 3:
Figure 4:
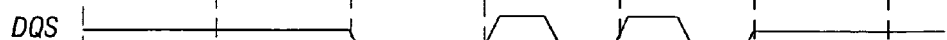
Figure 5:
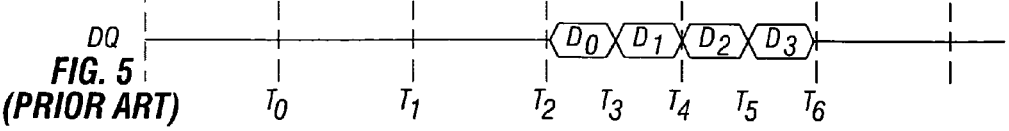
Figure 6:
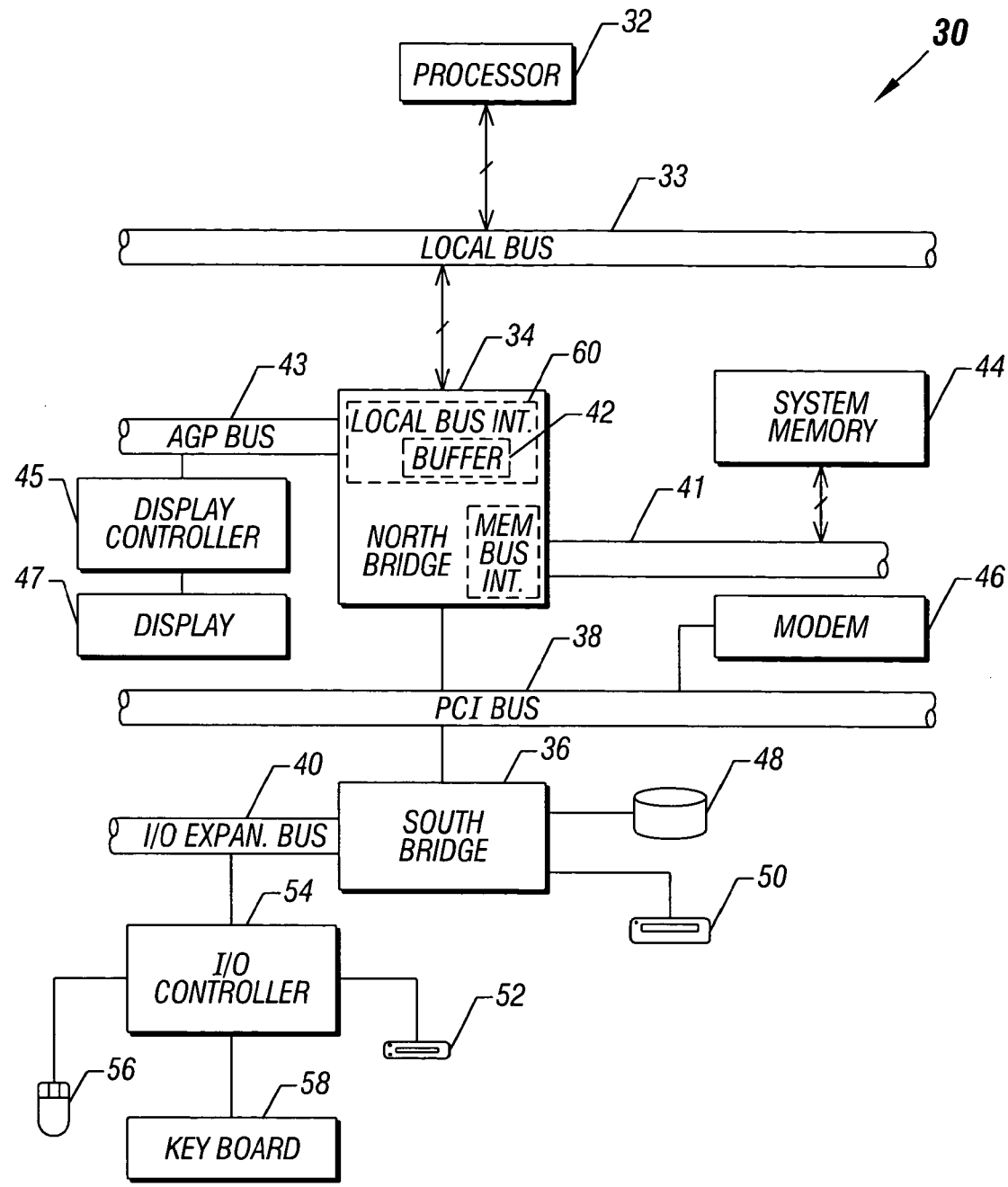
FIG. 6 is a schematic diagram of a computer system according to an embodiment of the invention.

Referring to FIG. 6, an embodiment 30 of a computer system in accordance with the invention includes a north bridge 34 that is adapted to minimize read latency that is introduced by the north bridge 34. In particular, a local bus interface 60 of the bridge 34 includes a buffer 42 that is adapted to capture read data directly from a memory bus 41. Thus, the read data is captured near a local bus 33 (and not near the memory bus 41), an arrangement that may reduce the number of internal clock cycles (of the bridge 34) that elapse in the transfer of data from the memory bus 41 to the buffer 42.

For example, a processor 32 (a central processing unit (CPU), as an example) may furnish signals to the local bus 33 to indicate a memory read operation. In response to the signals on the local bus 33, the bridge 34 may generate signals on the memory bus 41 to initiate a read operation with a system memory 44. In this manner, in the course of the memory read operation, the system memory 44 furnishes signals (to the memory bus 41) that indicate the requested read data. Unlike conventional bridges, the bridge 34 bypasses a memory bus interface 64 (of the bridge 34) and captures the read data directly into the buffer 42 of the local bus interface 60.

Figure 7:
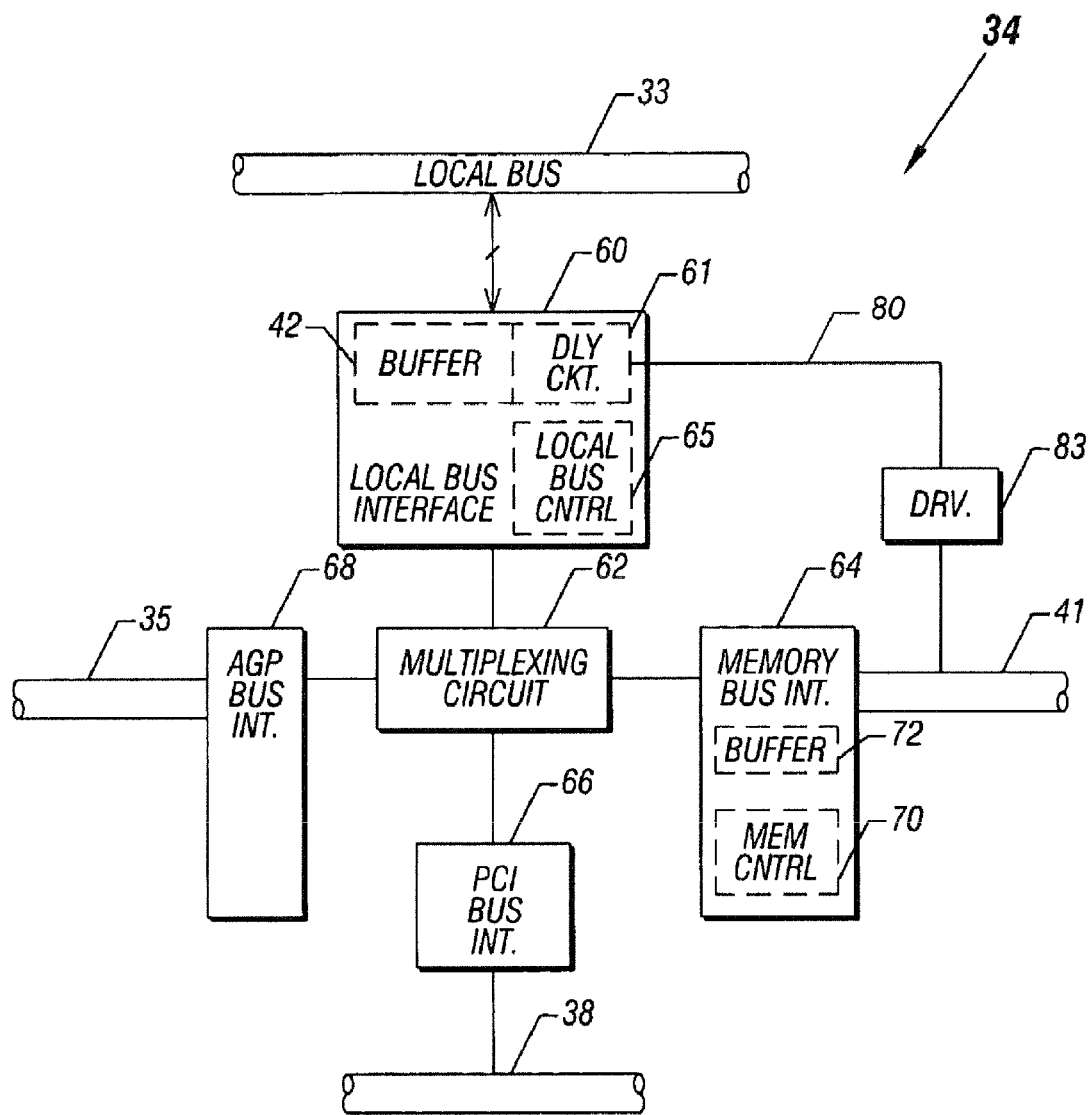
FIG. 7 is a schematic diagram of a bridge of the computer system of FIG. 6 according to an embodiment of the invention.

Referring to FIG. 7, more particularly, unlike conventional arrangements, the bridge 34 effectively extends the memory channel provided by the memory bus 41 inside the bridge 34. In this manner, the data and strobe lines of the memory bus 41 (via internal data and data strobe conductive traces, or lines 80) are effectively extended by placing the buffer 42 closer to the local bus 33 than to the memory bus 41. As a result of this arrangement, a much smaller asynchronous propagation delay is incurred in the transfer of data from the buffer 42 to the local bus 33, as compared to the asynchronous delay encountered in a conventional bridge in which the data is transferred from a memory bus interface (where the data is captured) to a local bus interface.

Thus, the transfer of read data through a conventional bridge circuit includes two latching events to compensate for asynchronous propagation delays: one latching event to capture the read data into a memory bus interface (that is located near the memory bus) and another latching event to capture the data in a local bus interface (that is located near the local bus) after the data propagates between the memory and local bus interfaces. Each of these latching events, in turn, consumes internal clock cycles of the conventional bridge, as each latching event must accommodate the worst case delay scenario. However, unlike this conventional arrangement, the bridge 34 compensates for the asynchronous delays that are introduced by the memory bus 41 and the data and data strobe lines 80 in one latching event. Thus, the bridge 34 provides a more efficient arrangement that may permit the data to be communicated across the bridge 34 in a fewer number of internal clock cycles, as compared to conventional bridges.

In some embodiments, the memory 44 may be formed from double data rate (DDR) synchronous dynamic random access memory (SDRAM) devices (double inline memory modules (DIMMs), for example), and the memory bus 41 may be a DDR memory bus. For these embodiments, the DQS data strobe signals from the memory bus 41 may be used to synchronize the capture of the data from the bus 41, as described below. For these embodiments, the local bus interface 60 may include a delay circuit 61 to align the edges of the DQS signals with the "data eyes" of the signals that indicate the data for purposes of capturing valid data from the memory bus 41. The delay circuit 61 may be initially programmed by execution of a basic input/output system (BIOS) during bootup of the computer system 30, and thereafter, the delay circuit 61 may regulate the introduced delay(s) to compensate for changing voltages and temperatures, factors that may affect the delay(s).

Among the other features of the bridge 34, the memory bus interface 64 may include a write buffer 72 for furnishing memory write data to the memory bus 41. The memory bus interface 64 may also include a memory controller 70 that furnishes signals (clock signals and control signals, as examples) to the memory bus 41 to perform selected memory bus operations (read, write and refresh operations, as examples) with the system memory 44. The local bus interface 60 may include a local bus controller 65 that, among other things, furnishes signals to encode and decode bus cycles on the local bus 33. A driver 83 of the bridge 34 may be coupled to the data and data strobe lines of the memory bus 41 and furnish signals that indicate the voltages of these lines to the end of the lines 80 closest to the memory bus 41.

Other bus interfaces of the bridge 34 may include an Accelerated Graphics Port (AGP) bus interface 68 and a Peripheral Component Interconnect (PCI) bus interface 66. The AGP is described in detail in the Accelerated Graphics Port Interface Specification, Revision 1.0, published on Jul. 31, 1996, by Intel Corporation of Santa Clara, Calif. The PCI Specification is available from the PCI Special Interest Group, Portland, Oreg., 97214.

Figure 8:
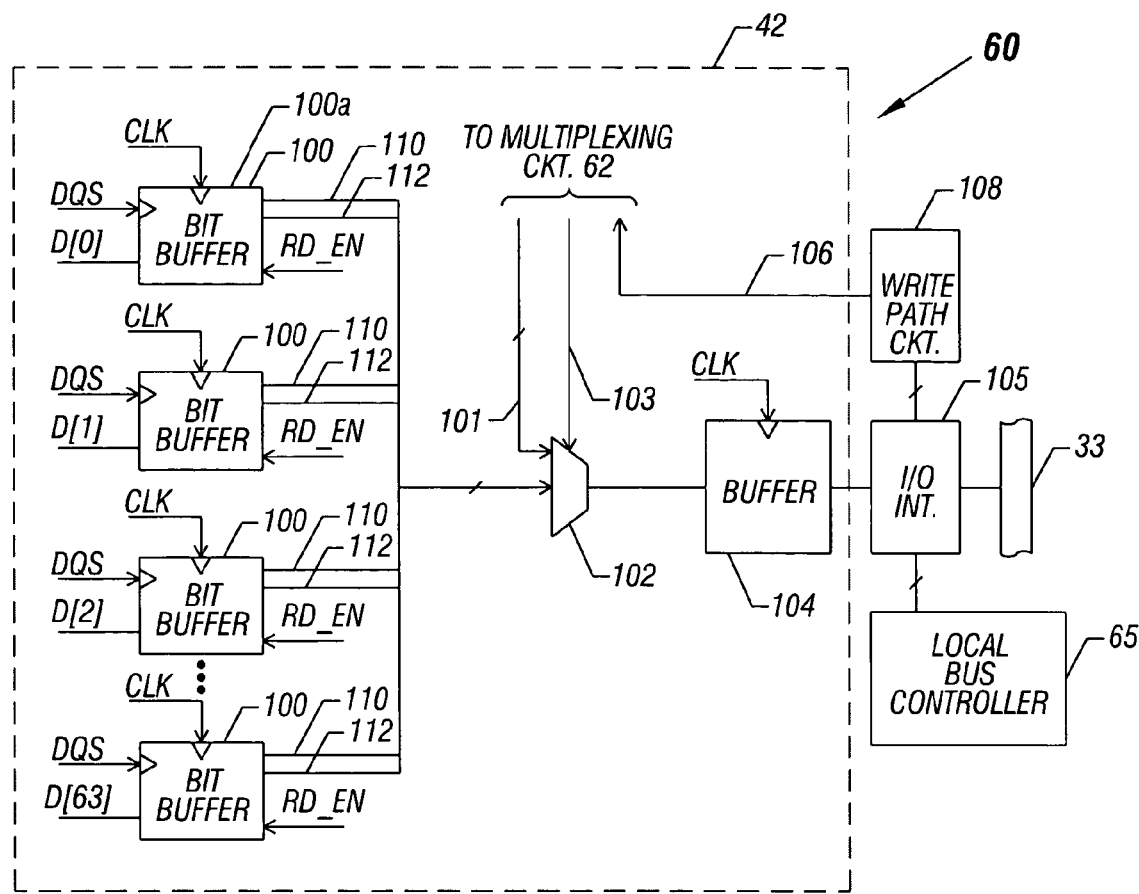
FIG. 8 is a schematic diagram of a buffer of a local bus interface of the bridge of FIG. 7 according to an embodiment of the invention.

Referring to FIG. 8, in some embodiments, the memory bus 41 may include sixty-four data lines that may be used to communicate sixty-four bits of data (i.e., one double Dword, or Qword) that are represented by the notation D[63:0], and the buffer 42 may include a bit buffer 100 for each data line of the memory bus 41. In some embodiments, each bit buffer 100 may store up to eight bits of data from eight respective Qwords that appear on the memory bus 41. Thus, collectively, in some embodiments, the sixty-four bit buffers 100 may store up to two cache lines (i.e., 64 bytes) of data. Two Qwords may be simultaneously retrieved from the bit buffers 100: an upper address Qword that is furnished by upper bit lines 110 (one upper bit line 110 per bit buffer 100) and a lower address Qword that is furnished by lower bits lines 112 (one lower bit line 112 per bit buffer 100).

Each bit buffer 100 latches its respective data bits on the positive and negative edges of a DQS data strobe signal. Different bit buffers 100 may receive different DQS signals from the lines 80. In this manner, the lines 80 are arranged so that each DQS signal experiences approximately the same delay as an associated group of the data signals. Thus, a particular DQS signal may be used to latch the bit buffers 100 that receive the data signals that are associated with the DQS signal.

The bit buffers 100 begin furnishing the latched bits to the bit lines 110 and 112 in synchronization with an internal clock signal (called CLK) when a read enable signal (called RD_EN) is asserted. Because the bit buffers 100 may store several entries (eight, for example) and the CLK signal may have a higher frequency (double the frequency, for example) than the frequency of the DQS strobe (when active), a sufficient number of cycles of the CLK signal may be permitted to elapse before the latched data is retrieved from the buffers 100 in order to ensure that the latched data is valid.

The upper 110 and lower 112 bit lines may be coupled to input terminals of a multi-bit multiplexer 102. Other input terminals 101 of the multiplexer 102 may be coupled to the multiplexing circuitry 62 for purposes of receiving data captured by the AGP 68 or PCI 66 bus interfaces. The selection of the data from either the bit buffers 100, the AGP interface 68, or the PCI bus interface 66 may be controlled by, for example, selection lines 103 that are coupled to the multiplexing circuitry 62. In some embodiments, the output terminals of the multiplexer 102 are coupled to a buffer 104 that stores data to be furnished to the local bus 33.

The local bus interface 60 may also include the local bus controller 65, an input/output (I/O) interface 105 for driving and buffering signals to/from the local bus 33 and write path circuitry 108.

Figure 9:
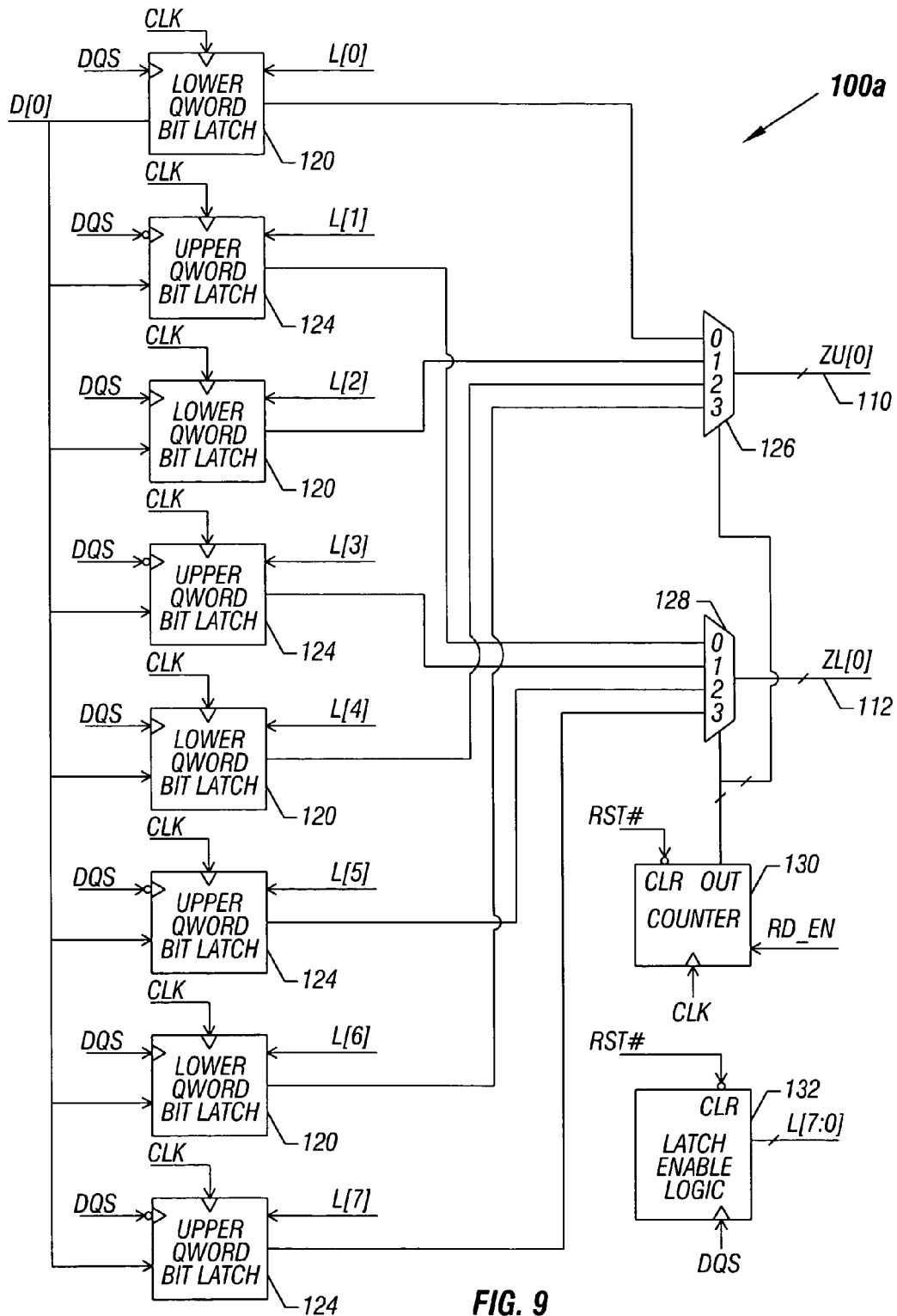
FIG. 9 is a schematic diagram of a bit buffer of the buffer of FIG. 8 according to an embodiment of the invention.

Referring to FIG. 9, as an example, in some embodiments, the bit buffer 100*a* that receives the D[0] bit may have the following design that is similar to the design of the other bit a buffers 100. In particular, in some embodiments, the bit buffer 100*a* may include lower Qword bit latches 120 that store the lowest order bits D[0] for the lower Qwords and upper Qword bit latches 124 that store the lowest order bits D[0] for the upper Qwords. The lower Qword bit latches 120 capture the D[0] bit on positive edges of the DQS signal when their respective latch enable signal (L[0], L[2], L[4] or L[6]) is asserted, and the upper Qword bit latches 124 capture the D[0] bit on negative edges of the DQS signal when their respective latch enable signal (L[1], [3], L[5] or L[7]) is asserted. Each latch enable signal is asserted for a different edge of the DQS signal, and thus the different latches 120, 124 store bits for Qwords from eight different memory locations.

The bit latch 100*a* may include a multi-bit multiplexer 126 that is coupled to the output terminals of the upper Qword bit latches 120 and a multi-bit multiplexer 128 that is coupled to the output terminals of the lower Qword bit latches 124. The multiplexer 126 provides the upper bit line 110 of the bit latch 100*a*, and the multiplexer 128 provides the lower bit line 112 of the bit latch 100*a*. The select terminals of both multiplexers 126 and 128 receive the same signals from a counter 130 that is clocked by the CLK signal. When the counter 130 is enabled (by the assertion of the RD_EN read enable signal), the counter 130 controls the multiplexers 126 and 128 so that the D[0] bits for the upper and lower Qword pair are provided at the same time. The bit latch 100*a* may include latch enable logic 132 that furnishes the latch enable signals. The latch enable logic 132 is clocked by the DQS signal.

Referring back to FIG. 6, beside the components described above, the computer system 30 may also include a display controller 45 that is coupled to the AGP bus 43 and controls a display 47. A modem 46, for example, may be coupled to the PCI bus 38 along with a south bridge 36. The south bridge 36 may provide an interface to an I/O expansion bus 40, a hard disk drive 48 and a CD-ROM 50. An I/O controller 54 may be coupled to the I/O expansion bus 40 and receive input from a mouse 56 and a keyboard 58. The I/O controller 54 may further control the operation of a floppy disk drive 52.

In this context of this application, the term "processor" may generally refer to at least one central processing unit (CPU), microcontroller or microprocessor, as just a few examples. The phrase "computer system" may refer to any type of processor-based system, such as a desktop computer or a laptop computer, as just a few examples. Thus, the invention is not intended to be limited to the illustrated computer system 30, but rather, the computer system is an example of one of many possible embodiments.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A system comprising:
    a local bus;
    a memory bus communicatively coupled to a memory device; and
    a bridge comprising:
        a memory bus interface coupled to the memory bus;
        a local bus interface comprising a first buffer and being coupled to the local bus, wherein the local bus interface is configured to receive a data signal and a data strobe signal from the memory bus; and
        a set of conductive traces configured to establish a communication path between the memory bus and the local bus interface, wherein the memory bus is configured to communicate the data signal and the data strobe signal from the memory bus to the local bus interface using the set of conductive traces, and wherein the set of conductive traces bypasses the memory bus interface.

2. The system of claim 1, wherein the memory bus comprises a driver coupled to the set of conductive traces.

3. The system of claim 1, wherein the set of conductive traces comprises at least 64 conductive traces forming a 64-bit wide communication path.

4. The system of claim 1, wherein the first buffer is configured to capture data represented by the data signal from the set of conductive traces.

5. The system of claim 4, wherein the first buffer is located spatially closer to the local bus than to the memory bus.

6. The system of claim 1, wherein the memory bus interface comprises a memory controller configured to issue read, write, and refresh commands to the memory bus, and a second buffer configured to receive and store data that is to be written to the memory device.

7. The system of claim 1, wherein the bridge comprises multiplexing logic coupled to the local bus interface, the memory bus interface, and at least one other interface comprising a Peripheral Component Interconnect (PCI) interface, an Accelerated Graphics Port (AGP) interface, or some combination thereof.

8. The system of claim 1, wherein the conductive traces are configured to communicate the data signal from the memory bus to the local bus interface if the data signal comprises read data requested in response to a read command; and
    wherein the local bus interface is configured to communicate data received in response to a write command from the local bus interface to the memory bus through the memory bus interface without using the conductive traces.

9. A method for capturing read data from a memory bus in a computing system comprising:
    identifying a set of data stored in a memory device, wherein the set of data is requested by a read operation issued by a memory controller of a memory bus interface coupled to the memory bus;
    providing the set of data to the memory bus; and
    receiving, at a local bus interface, the set of data directly from the memory bus using a communication path that bypasses the memory bus interface.

10. The method of claim 9, wherein the communication path comprises an extended memory channel that bypasses the memory bus interface using a plurality of conductive traces, each conductive trace forming a data line.

11. The method of claim 10, wherein the local bus interface comprises a buffer configured to store the data indicated by the received set of data.

12. The method of claim 11, wherein the buffer comprises a plurality of bit buffers, wherein each of the plurality of bit buffers receives data provided by a data line corresponding to a respective one of the plurality of conductive traces.

13. The method of claim 11, comprising, after receiving the set of data at the local bus interface, using an input/output (I/O) interface to provide the set of data stored by the buffer to a local bus coupled to the local bus interface.

14. The method of claim 10, wherein the set of data comprises a data signal and a data strobe signal.

15. The method of claim 14, wherein the memory bus comprises a data line configured to provide the data signal and a strobe line configured to provide the data strobe signal, and wherein receiving the set of data at the local bus interface comprises using a driver circuit coupled to the data line and the data strobe line to furnish signals indicative of a voltage of the data line and a voltage of the strobe line to the plurality of conductive traces.

16. A bridge comprising:
    a local bus interface coupled to a local bus of a computing system;
    a memory bus interface coupled to a memory bus of the computing system; and
    a plurality of data lines forming a data path between the memory bus and the local bus interface that bypasses the memory bus interface, wherein data furnished to the memory bus in response to a read operation may be directly communicated to the local bus interface by the plurality of data lines without first being communicated to the memory bus interface.

17. The bridge of claim 16, wherein the memory bus interface comprises a memory controller configured to issue a read command that initiates the read operation.

18. The bridge of claim 16, wherein the furnished data comprises a data signal and a data strobe signal.

19. The bridge of claim 18, wherein the local bus interface comprises a delay circuit configured to receive and align the data signal and the data strobe signal.

20. The bridge of claim 19, wherein the delay circuit aligns the data signal and the data strobe signal by aligning either a rising edge or a falling edge of the data strobe signal with a center of a data eye of the data signal.

21. The bridge of claim 19, wherein the local bus interface comprises a data buffer configured to stored data indicated by the data signal after the data signal and the data strobe signal are aligned by the delay circuit.

22. The bridge of claim 19, wherein the memory bus comprises a driver coupled to one or more conductive traces forming the plurality of data lines.

23. A method for manufacturing a bridge device for use in a computing system comprising:
    providing a local bus interface;
    coupling the local bus interface to a local bus of the computing system;
    providing a memory bus interface;
    coupling the memory bus interface to a memory bus of the computing system; and
    providing a plurality of conductive traces coupling the memory bus to the local bus interface, wherein the memory bus is configured to communicate a data signal and a data strobe signal in response to a read command directly to the local bus interface using the plurality of conductive traces without first communicating the data signal and the data strobe signal to the memory bus interface.

24. The method of claim 23, comprising providing a memory controller configured to issue the read command.

25. The method of claim 23, comprising providing multiplexing logic, wherein the local bus interface and the memory bus interface are both coupled to the multiplexing logic, and wherein the multiplexing logic provides a communicative path between the local bus interface and the memory bus interface.

26. The method of claim 23, wherein providing the local bus interface comprises providing the local bus interface being configured to, in response to a write command, communicate data signals associated with the write command from the local bus interface to the memory bus through the memory bus interface without using the conductive traces.

* * * * *